United States Patent Office 3,494,942
Patented Feb. 10, 1970

3,494,942
TOTAL SYNTHESIS OF 13-HYDROCARBON-SUBSTITUTED GONAPOLYENES
Takuichi Miki, Kentaro Hiraga, Ikeda, and Tsunehiko Asako, Suita, Japan, assignors to Takeda Chemical Industries, Ltd., Osaka, Japan
No Drawing. Filed Nov. 13, 1967, Ser. No. 682,503
Claims priority, application Japan, Nov. 11, 1966, 41/74,186; Dec. 16, 1966, 41/82,618; Jan. 11, 1967, 42/2,075; Feb. 9, 1967, 42/8,339
Int. Cl. C07c 169/08; A61k 17/06
U.S. Cl. 260—397.5          4 Claims

ABSTRACT OF THE DISCLOSURE

A compound having a 13-hydrocarbon-substituted 8,14-secogona-1,3,5(10),9,15 - pentaene-14,17-dione nucleus can readily be produced by allowing a compound having a 2 - (1'-hydroxy-1'-tetralino)ethylene or S-2-(1'-tetraliden)ethylthiuronium nucleus to react with a compound having a 4 - hydroxy-2-hydrocarbon-substituted cyclopentane-1,3-dione nucleus accompanied concomitantly by a condensation and dehydration reaction, that so-obtained compound having a 13 - hydrocarbon-substituted 8,14-secogona-1,3,5(10),9,15-pentaene-14,17-dione nucleus is readily converted to a compound having a 13-hydrocarbon-substituted gona - 1,3,5(10),8(14),9,15 - hexaen-17-one nucleus in the presence of an acid catalyst, that so-obtained compound having a 13-hydrocarbon-substituted gona - 1,3,5(10),8(14),9,15 - hexaen-17-one nucleus is selectively reduced to a compound having a 13-hydrocarbon-substituted gona - 1,3,5(10),8,(14),9,15-hexaen-17β-ol nucleus by reaction with a metallic hydride compound, and that so-obtained compound having a 13-hydrocarbon - substituted gona - 1,3,5(10),8,(14),9,15-hexaen-17β-ol nucleus is readily reduced to a compound having a 13 - hydrocarbon-substituted gona-1,3,5(10),8-tetraen-17β-ol nucleus by a catalytic reduction, which compound can be converted to estradiol or its 13-homologues by a per se known process. Furthermore, a compound having a 13 - hydrocarbon - substituted 8,14-secogona-1,3,5(10),9,15 - pentaene-14,17-dione nucleus is converted selectively in one step to a compound having a 17α-hydroxy-13-hydrocarbon-substituted 8,14-secogona-1,3,5,(10),9-tetraen-14-one nucleus or a compound having a 13 - hydrocarbon-substituted - 8,14 - secogona-1,3,5(10),9-tetraene-14,17-dione nucleus, respectively.

---

The present invention relates to a novel process for producing a compound having a gonapolyene nucleus substituted in the 13-position by a hydrocarbon residue, e.g. a lower alkyl, benzyl or phenyl radical, and novel intermediates therefor. More concretely, this invention relates to an improved total synthesis of a compound having a 13-substituted gona-2,5(10)-diene nucleus, a compound having a 13-substituted gona-1,3,5(10)-triene nucleus or a compound having a 13-substituted gona-1,3,5(10),8-tetraene nucleus and of novel intermediates therefor, e.g. a compound having a 13-substituted gona-1,3,5(10),8(14),9,15-hexaen-17β-ol nucleus a compound having a 13 - substituted gona - 1,3,5(10)8(14),9,15-hexaen-17-one nucleus, a compound having a 13-substituted 8,14-secogona-1,3,5(10),9,15-pentaene-14,17 - dione nucleus, all of which have a hydrocarbon residue at the position 13 as a substituent.

The reason why partial synthesis has overwhelmed total synthesis in the industrial production of steroids is the difficulty in treating a number of diastereoisomers which are concomitantly formed either at the cyclization to form the steroid skeleton or at the saturation of the internuclear unsaturated bonds.

Recently, Hughes and Smith reported a stereo-selective total synthesis of (+)-estrone, starting from 5-(m-methoxyphenyl) pent - 1 - yne via (+)-estra-1,3,5(10),8,14-pentaen-17-one (Chemistry and Industry, 1960, pages 1022–1023 with reference to Proceedings of Chemical Society, 1960, pages 74–75). Furthermore, more improved total synthesis of 19-nor-steroids is reported independently by Smith et al. (Experientia, 19, 394–396 (1963, No. 8), Windholz et al. (Journal of Organic Chemistry, 28, 1092–1094 (1963)), Miki et al. (Proceedings of the Chemical Society, May 1963, 139) and Crispin et al. (ibid, January 1963, 22). Although the latter process brought a hope of realizing an industrial total synthesis of steroids, the process is still accompanied by some difficulties, one of which is that the process involves a very long series of steps, and another is that 2-substituted cyclopentane-1,3-dione, one of the starting compounds of this process, is rather expensive.

The present invention is based upon unexpected discoveries that a compound having a 13-hydrocarbon-substituted 8,14-secogona-1,3,5(10),9,15 - pentaene-14,17-dione nucleus can readily be produced by allowing a compound having a 2 - (1'-hydroxy-1'-tetralino)ethylene or S-2-(1'-tetraliden)ethylthiuronium nucleus to react with a compound having a 4 - hydroxy-2-hydrocarbon-substituted cyclopentane-1,3-dione nucleus accompanied concomitantly by a condensation and dehydration reaction, that so-obtained compound having a 13 - hydrocarbon-substituted 8,14 - secogona-1,3,5(10),9,15-pentaene-14,17-dione nucleus is readily converted to a compound having a 13 - hydrocarbon-substituted gona-1,3,5(10),8(14),9,15-hexaen-17-one nucleus in the presence of an acid catalyst, that so-obtained compound having a 13 - hydrocarbon-substituted gona - 1,3,5(10),8(14),9,15 - hexaen-17-one nucleus is selectively reduced to a compound having a 13-hydrocarbon - substituted gona - 1,3,5(10),8(14),9,15-hexaen-17β-ol nucleus by reaction with a metallic hydride compound, and that so-obtained compound having a 13-hydrocarbon - substituted gona - 1,3,5(10),8(14),9,15-hexaen-17β-ol nucleus is readily reduced to a compound having a 13-hydrocarbon-substituted gona - 1,3,5(10),8-tetraen-17β-ol nucleus by a catalytic reduction, which compound can be converted to estradiol or its 13-homologues by a per se known process. Furthermore, it was found that a compound having a 13-hydrocarbon-substituted 8,14-secogona-1,3,5(10),9,15-pentaene-14,17 - dione nucleus is converted selectively in one step to a compound having a 17α-hydroxy-13-hydrocarbon-substituted 8,14-secogona-1,3,5,(10),9 - tetraen-14-one nucleus or a compound having a 13 - hydrocarbon-substituted-8,14-secogona - 1,3,5(10),9 - tetraene - 14,17 - dione nucleus, respectively.

As a result of these discoveries, it is possible to save two steps in the total synthesis of steroids, as shown in the following reaction scheme.

In other words, the sequence:

$$(I) + (II) \rightarrow (III) \rightarrow (IV) \rightarrow (V) \rightarrow (VI)$$

and the sequence:

$$(I) + (II) \rightarrow (III) \rightarrow (g)$$

can save two steps compared with the known process passing through steps

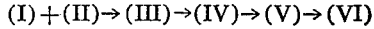
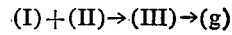

and the process

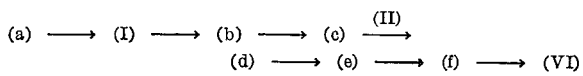
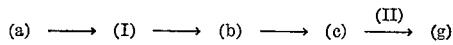

respectively. Furthermore, the present invention makes it possible to employ 4-hydroxy-2-substituted-cyclopentane- 1,3-dione, which is readily obtained from 2-substituted cyclopentane-1,3,4-trione in a high yield (Journal of American Chemical Society 65 (1943), 2296), instead of 2-substituted-cyclopentane-1,3-dione which has been used in the known total synthesis of steroids, but only in a very low yield.

Further, it is found that novel intermediates of steroids in the present process, especially the compounds having a 13-substituted-gona-1,3,5(10),8(14),9,15-hexaen-17β-ol nucleus, have a very strong anti-cholesteremic activity.

A primary object of the present invention is to provide a process for producing a compound having at 13-substituted - 8,14 - secogona - 1,3,5(10),9,15 - pentaene - 14,17-dione nucleus, which is convertible to a natural type of 19-norsteroid.

Another object of this invention is to provide a process for producing a compound having a 13-substituted-gona-1,3,5(10),8(14),9,15-heraen-17-one nucleus by cyclization of a compound having a 13-substituted-8,14-secogona-1,3,5(10),9,15-pentaene-14,17-dione nucleus.

A further object of this invention is to provide a process for producing a compound having a 13-substituted-gona-1,3,5(10),8(14),9,15-hexaen-17β-ol nucleus from a compound having a 13-substituted-gona-1,3,5(10),8(14),9,15-hexaen-17-one nucleus.

A further object of this invention is to provide a process for producing a compound having a 13-substituted-gona-1,3,5(10),8-tetraen-17β-ol nucleus from a compound having a 13 - substituted - gona - 1,3,5,(10),8(14),9,15 - hexaen-17β-ol nucleus.

Still another object of this invention is to provide a novel compound having a 13-substituted-8,14-secogona-1,3,5(10),9,15-pentaene-14,17-dione nucleus, a novel compound having a 13-substituted-gona-1,3,5(10),8(14),9,15-hexaen-17-one nucleus, and a novel compound having a 13 - substituted - gona - 1,3,5(10),8(14),9,15 - hexaen - 17β-ol nucleus, useful as anticholesteremic agent.

Other objects will become apparent from the detailed description hereinafter provided.

The first step of the present total synthesis is a condensation reaction between a compound having a 4-hydroxy - 2 - hydrocarbon - substituted cyclopentane - 1,3 - dione nucleus (I) on the one hand and a compound having a 2-(1'-hydroxy-1'-tetralino)ethylene or S-2-(1'-tetralidene)ethylthiuronium nucleus (II) on the other hand to give a compound having an 8,14-secogona-1,3,5(10),9,15-pentaene-14,17-dione nucleus (III).

The compounds having a 4-hydroxy-2-substituted cyclopentane-1,3-dione nucleus having the general structure represented by the formula:

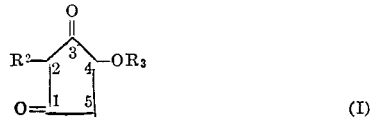

wherein $R^2$, the substituent at position 2, is a hydrocarbon residue, which is exemplified by lower alkyl (e.g. methyl, ethyl, n-propyl, isopropyl, n-butyl, isobutyl and tertiary butyl), phenyl and benzyl, and $R^3$ is a hydrogen atom. One of the hydrogen atoms at the position 5 of these compounds may further be replaced by a hydrocarbon residue as exemplified above. The compounds having a 2-(1'-hydroxy-1'-tetralino)ethylene or S-2-(1'-tetraliden)ethylthiuronium nucleus have the general structure represented by the formula:

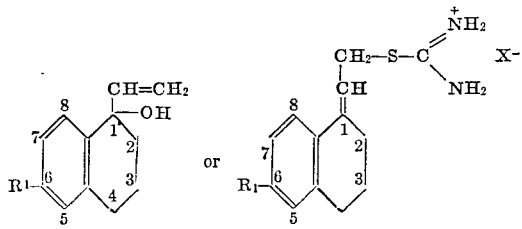

wherein $R^1$ is H, hydroxyl, etherified hydroxyl (e.g. methoxy, ethoxy, benzyloxy, etc.), or esterified hydroxyl (e.g. acetyloxy, nicotinoyloxy, etc.) and X is lower acyloxy radical (e.g. acetyloxy, propionyloxy, etc.), halogen (e.g. chlorine, bromine), the perchloro radical, the sulfate radical, etc., and may be substituted, for example, at one or more of the positions 3, 4, 5, 7 and 8 in the tetralin skeleton, by a hydrocarbon residue such as lower alkyl (e.g. methyl, ethyl, n-propyl, isopropyl, n-butyl and isobutyl), phenyl or benzyl, and/or, at one or more of the positions 5, 7 and 8 in the skeleton, by a hydroxyl group, an etherified hydroxyl group (e.g. methoxy, ethoxy, n-propoxy and n-butoxy, etc.), an esterified hydroxyl group (e.g. acetoxy, propionyloxy and benzoyloxy, etc.), a halogen (e.g. fluorine and chlorine), a thio group (e.g. mercapto, methylthio, ethylthio and acetylthio, etc.) and an acyl group (e.g. acetyl, propionyl and benzoyl, etc.).

The condensation reaction is carried out with or without the use of a suitable solvent. The reaction is accelerated by the presence of a basic catalyst. As the preferable basic catalyst, there may be exemplified, for example, alkali metal hydroxides (e.g. sodium hydroxide and potassium hydroxide), alkali metal carbonate (e.g. sodium carbonate, sodium hydrogen carbonate, potassium carbonate and potassium hydrogen carbonate) alkali metal acylates e.g. sodium acetate and potassium acetate), quaternary ammonium hydroxides (e.g. trimethyl benzyl ammonium hydroxide, etc.), tertiary amines (e.g. trimethyl amine, triethyl amine, etc.), anion exchange resins (e.g. strongly basic styrene-type copolymer resins), metal alkoxides (e.g. sodium methylate, sodium ethylate, potassium methylate, potassium ethylate and magnesium ethylate, etc.), alumina and mixtures of two or more thereof. Basic solvents, such as acid amide (e.g. dimethyl formamide and dimethylacetamide, etc.), and amines (e.g. pyridine, collidine and aldehyde collidine, etc.) can be used solely or in combination with any other basic catalyst, not only as catalyst but also as the solvent for the reaction. Other desirable solvents include, for example, water, methanol, ethanol, n-propanol, isopropanol, n-butanol, tetrahydrofuran, dioxane ether petroleum ether, chloroform, benzene, toluene and xylene, and any other solvent can be used in so far as they do not inhibit or disturb the aimed condensation reaction.

The reaction proceeds under cooling or at room temperature (about 15° to about 30° C.) and is accelerated by heating. Usually, it is convenient to carry out the reaction at the neighborhood of 130° C., or under refluxing conditions. In order to displace any equilibrium toward an acceleration of the reaction, water produced in the course of the condensation reaction can desirably be eliminated from the reaction mixture by heating or as its azeotropic mixture with the solvent used. For the same purpose, a basic or neutral dehydrating agent may be allowed to co-exist in the reaction system, the dehydrating agent being exemplified by calcium oxide or so-called molecular sieve.

Thus-obtained compounds having a 13-substituted-8,14-secogona-1,3,5(10),9,15-pentaene-14,17-dione nucleus are exemplified as follows:

8,14-secoestra-1,3,5(10),9,15-pentaene-14,17-dione;
3-methoxy-8,14-secoestra-1,3,5(10)9,
   15-pentaene-14,17-dione;
3-ethoxy-8,14-secoestra-1,3,5(10),9,15-pentaene-
   14,17-dione;
13-ethyl-8,14-secogona-1,3,5(10),
   9,15-pentaene-14,17-dione;
13-isopropyl-8,14-secogona-1,3,5(10), 9,
   15-pentaene-14,17-dione;
13-benzyl-8,14-secogona-1,3,5(10), 9,
   15-pentaene-14,17-dione;
13-phenyl-8,14-secogona-1,3,5(10),9,
   15-pentaene-14,17-dione;
3-methoxy-13-ethyl-8,14-secogona-1,3,5(10),9,
   15-pentaene-14,17-dione;

3-methoxy-13-n-propyl-8,14-secogona-1,3,
5(10),9,15-pentaene-14,17-dione;
3-methoxy-13-isopropyl-8,14-secogona-1,3,
5(10,9,15-pentaene-14,17-dione;
3-methoxy-13-phenyl-8,14-secogona-1,3,
5(10),9,15-pentaene-14,17-dione;
3-methoxy-13-benzyl-8,14-secogona-1,3,
5(10),9,15-pentaene-14,17-dione.

The second step of the present total synthesis is an intramolecular cyclization of the compounds (III), resulting in closure of the ring C to give compounds having a 13 - substituted-gona-1,3,5(10),8(14),9,15-hexaen-17-one nucleus (IV).

The cyclization is accelerated by the use of an acid catalyst, which is exemplified by inorganic acids or their anhydrides (e.g. hydrochloric acid, sulfuric acid, phosphoric acid, phosphorus pentoxide and polyphosphoric acid, etc.), hydrogen salts or partial esters of these polybasic inorganic acids (e.g. sodium hydrogen sulfate, monosodium dihydrogen phosphate and monomethyl sulfate, etc.), their pyridine complexes (e.g. pyridine-hydrobromic acid complex), sulfonic acids (e.g. methanesulfonic acid, ethanesulfonic acid, benzenesulfonic acid and toluenesulfonic acid, etc.), sulfonated styrene-type cation exchange resins, so-called Lewis acids (e.g. aluminum chloride, boron trifluoride and tin chloride, etc.) and silica gel.

This reaction does not require any solvent. However, the reaction can be effected more smoothly by the use of a suitable solvent, such as benzene, toluene, xylene, tetrahydrofuran, dibutyl ether, methanol, ethanol and propanol, etc. This reaction is also accelerated by heating and takes place easily under mild heating. The reaction is advantageously carried out in the range of 60° C. to 100° C.

The reaction of this step appears to take place via 14-hydroxygona-1,3,5(10),9,15-pentaen-17-ones as intermediates, because such mild conditions as the use of silica gel often cause the production of these intermediates, which are readily converted by further contact with a rather drastic acid catalyst to yield the desired compounds (IV).

The resulting compounds having a 13-substituted gona-1,3,5(10), 8(14),9,15-hexaen-17-one nucleus (IV) have the general structure shown by the formula:

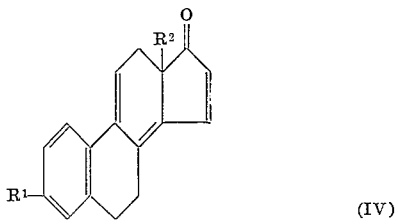

(IV)

wherein each of $R^1$ and $R^2$ is as defined above, and includes the substituent or substituents corresponding to the starting compounds, when the later are substituted; that is, a any of the positions 1, 2, 4, 6, 7 and 15, one or more of the hydrocarbon residues exemplified with regard to compounds (I) and (II), and/or at any of the positions 1, 2 and 4 hydroxyl, etherified hydroxyl, esterified hydroxyl, halogen and thio, as exemplified with regard to compounds (II). Among them, those especially desirable for the purpose include, for example:

Estra-1,3,5(10),8(14),9,15-hexaen-17-one;
3-methoxyestra-1,3,5(10),8(14),9,15-hexaen-17-one;
3-ethoxyestra-1,3,5(10),8(14),9,15-hexaen-17-one;
3-n-propoxyestra-1,3,5(10),8(14),9,15-hexaen-17-one;
13-ethylgona-1,3,5(10),8(14),9,15-hexaen-17-one;
13-isopropylgona-1,3,5(10),8(14),9,15-hexaen-17-one;
13-phenylgona-1,3,5(10),8(14),9,15-hexaen-17-one;
13-benzylgona-1,3,5(10),8(14),9,15-hexaen-17-one;
3-methoxy-13-ethylgona-1,3,5(10),8(14),9,15-hexaen-17-one;
3-methoxy-13-n-propylgona-1,3,5(10),8(14),9,15-hexaen-17-one;
3-methoxy-13-phenylgona-1,3,5(10),8(14),9,15-hexaen-17-one;
3-methoxy-13-benzylgona-1,3,5(10),8(14),9,15-hexaen-17-one.

All the exemplified compounds show characteristic ultraviolet absorption bands in the range of the wave lengths of about 255, 290, 315 and 380 millimicrons.

The third step of the present invention comprises a selective reduction of a compound having a 13-substituted gona-1,3,5(10),8(14),9,15-hexaen-17-one nucleus (IV), to produce a compound having a 13-substituted gona-1,3,-5(10),8(14),9,15-hexaen-17β-ol nucleus (V).

A means for converting compound (IV) to compound (V) is realized by reduction of the former with a specified reducing agent. Reducing agents applicable to the reduction of (IV) to the corresponding hexaenols (V) must be capable of reducing a carbonyl to a carbinol without attacking carbon-to-carbon double bonds. Preferable reducing agents include metallic hydride compounds, for example, alkali metal boron hydrides (e.g. lithium boron hydride, sodium boron hydride and potassium boron hydride), alkali metal aluminum hydrides (e.g. lithium aluminum hydride, sodium aluminum hydride and potassium aluminum hydride), diethyl aluminum hydride and aluminum isopropoxide. The reaction is usually carried out in a solvent. A desirable solvent can be selected from usual organic solvents as long as the solvent does not hinder or disturb the course of the reaction, and may be exemplified by methanol, ethanol, n-propanol, isopropanol, n-butanol, tetrahydrofuran, dioxane, ether, petroleum ether, chloroform, benzene and toluene. The hydride-type reducing agents as exemplified above are generally allowed to react with the compounds (IV) at a rather low temperature, e.g. below an ambient temperature (about 20–25° C.) but higher than about −60° C., while the reaction of the alkoxide-type reducing agents is desirably accelerated by heating and usually carried out in boiling isopropanol or ethanol which is taking both the roles of solvent and reactant.

The compound (V) thus produced is new and useful for the purpose of the present invention, and has the general structure shown by the formula:

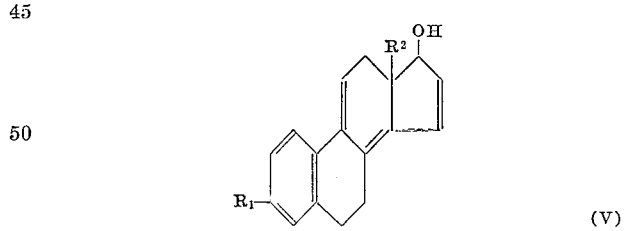

(V)

wherein each of $R^1$ and $R^2$ has the same meaning as defined above in connection with Formulas I and II, and may have a substituent or substituents corresponding to the starting compounds (I) and (II). Among them, those especially advantageous for the purpose include, for example:

Estra-1,3,5(10),8(14),9,15-hexaen-17β-ol;
3-methoxyestra-1,3,5(10),8(14),9,15-hexaen-17β-ol;
3-ethoxyestra-1,3,5(10),8(14),9,15-hexaen-17β-ol;
13-ethylgona-1,3,5(10),8(14),9,15-hexaen-17β-ol;
13-isopropylgona-1,3,5(10),8(14),9,15-hexaen-17β-ol;
13-phenylgona-1,3,5(10),8(14),9,15-hexaen-17β-ol;
13-benzylgona-1,3,5(10),8(14),9,15-hexaen-17β-ol;
3-methoxy-13-ethylgona-1,3,5(10),8(14),9,15-hexaen-17β-ol;
3-methoxy-13-isopropylgona-1,3,5(10),8(14),9,15-hexaen-17β-ol;
3-methoxy-13-phenylgona-1,3,5(10),8(14),9,15-hexaen-17β-ol;
3-methyl-13-benzylgona-1,3,5(10),8(14),9,15-hexaen-17β-ol;

It is found that the obtained compound (V) can be converted stereoselectively and exclusively in one step to the corresponding 13-substituted gona-1,3,5(10),8-tetraen-17β-ol (VI) in which the hydrogen attached to the position 14 is oriented to α-configuration; that is, the same configuration as estrogenic steroids obtained from natural sources.

The conversion of compound (V) to compound (VI) is conveniently effected by so-called catalytic reduction. For this purpose, Raney nickel or palladium catalyst is advantageously used. The reaction may be carried out in a suitable solvent which is exemplified by dioxane, tetrahydrofuran, ether, methanol, ethanol and acetic acid. The reaction usually takes place at an ambient temperature; but, if required, it may be carried out at an elevated or lowered temperature. At any event, too drastic conditions should be avoided for this reaction, since there may take place further hydrogenation at the positions 8 and 9 which may result in opposite configuration of the hydrogen at the position 8 in the product.

The compound (VI) thus produced is also useful for the purpose of the present invention and has the general structure shown by the formula:

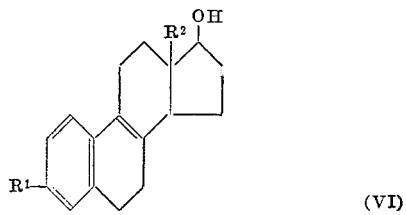

(VI)

wherein each of $R^1$ and $R^2$ is a defined above. It may also contain, for example, at any of the positions 1, 2, 4, 6, 7 and 15, one or more hydrocarbon residues as described with regard to compounds (I) and (II), and/or, at any of the positions 1, 2 and 4, hydroxyl, etherified hydroxyl (e.g. methoxy, ethoxy, propoxy and butoxy) as well as esterified hydroxyl, halogen, and thio, as described with regard to compound (II). Among them, those especially advantageous for the purpose include, for example:

Estra-1,3,5(10),8-tetraen-17β-ol;
3-methoxyestra-1,3,5(10),8-tetraen-17β-ol;
3-ethoxyestra-1,3,5(10),8-tetraen-17β-ol;
13-ethylgona-1,3,5(10),8-tetraen-17β-ol;
13-isopropylgona-1,3,5(10),8-tetraen-17β-ol;
13-phenylgona-1,3,5(10),8-tetraen-17β-ol;
13-benzylgona-1,3,5(10),8-tetraen-17β-ol;
3-methoxy-13-ethylgona-1,3,5(10),8-tetraen-17β-ol;
3-methoxy-13-isopropylgona-1,3,5(10),8-tetraen-17β-ol;
3-methoxy-13-phenylgona-1,3,5(10),8-tetraen-17β-ol;
3-methoxy-13-benzylgona-1,3,5(10),8-tetraen-17β-ol.

Most of these compounds (VI) are known (cf. Belgian Patent No. 608,369 and Japanese patent publication Nos. 18820/1966 and 19339/1966).

Thus-prepared compound (VI) is subjected to a further reduction to saturate the double bond at the position 8, or, if necessary, at the position 8 and aromatic ring by per se known procedure to give the corresponding compound having a 13-substituted-gona-1,3,5(10)-trien-17β-ol nucleus (VII) or a compound having a 13-substituted-gona-2,5(10)-dien-17β-ol nucleus (VIII), which may be converted into a compound having a 13-substituted-gona-1,3,5(10)-trien-17-one nucleus (IX) or a compound having a 13-substituted-gona-2,5(10)-dien-17-one nucleus (X), respectively.

Total synthesis of a steroid generally yields its racemic mixture, and the synthesis of the present invention is no exception. That is to say, the compound (IV) produced by the present invention substantially comprises a racemic mixture of 13α- and 13β-isomers, and, therefore, the corresponding products (V), (VI), (VII), (VIII), (IX) and (X) are respectively a racemic mixture of 13α- and 13β-isomers.

Therefore, in order to obtain an optically active product, racemic resolution is required. The racemic resolution mentioned hereinafter is applicable to any of the compounds respectively having e.g. a (±) 13-substituted-gona-1,3,5(10),8,(14),9,15-hexaen-17β-ol nucleus (V), a (±) 13-substituted-gona-1,3,5(10),8-tetraen-17β-ol nucleus (VI), a (±) 13 - substituted-gona-1,3,5(10)-trien-17β-ol nucleus (VII) or a (±) 13-substituted-gona-2,5(10)-dien-17β-ol nucleus (VIII). In general, it is preferable to carry out the racemic resolutions at a stage as early as possible.

In the method of the present invention, racemic resolution is carried out easily by utilizing the existing 17β-hydroxyl group. One means for effecting the racemic resolution is the so-called "diastereomer method" and another means is enzymic hydrolysis of an acylated derivative of the product.

In the first means of racemic resolution, the 17β-hydroxy steroids are allowed to react with an optically active acid or its acid halide—e.g. 1-methoxyacetic acid or its chloride or bromide—to give a mixture of the corresponding diastereomers, conventionally separating respective diastereomers, e.g. by fractional recrystallization, followed by hydrolysis to recover the optically active 17β-ols. In place of acylation with an optically active acid, the 17β-ol may be esterified with a dibasic acid—e.g. succinic acid, phthalic acid or sulfobenzoic acid—by means of its reactive derivative such as an anhydride or a chloride to give the corresponding hemiester, followed by the formation of salts with an optically active base such as ephedrine, strychnine or brucine.

In an alternative procedure for the racemic resolution, the 17β-ol is acylated in per se conventional manner to give the 17-acylate such as acetate, acetoacetate, glycinate, diethylaminoacetate, hemisuccinate or hemiadipate, and the resulting acylate is subjected to an enzymatic hydrolysis in an aqueous medium containing hydrolase which may be exemplified by diastase, lipase and trypsin. The technique of effecting the enzymic hydrolysis is referred to in U.S. Patent No. 3,094,465 and the hydrolysis and the recovery of steroids can be carried out after the manner described in the said patent. Some microorganisms capable of producing said hydrolase may directly be brought into contact with the 17-acylates. Such microorganisms include, for example, those belonging to the genera Rhizopus and Aspergillus.

Furthermore, the compounds having a 13-hydrocarbon-substituted 8,14-secogona-1,3,5(10),9,15-pentaene-14,17-dione nucleus (III) are selectively reduced by the action of a reducing agent to obtain the corresponding compounds having a 17α-hydroxy-13-hydrocarbon-substituted 8,14 - secogona - 1,3,5(10),9 - tetraen - 14 - one nucleus (g), which can be converted to estradiols or 13-homologues thereof by a per se known process through (h), (i), (j) and (k) (cf. Chemistry and Industry, July 30, 1966, pp. 1340-1341). For such selective reduction, use can be made of the same metallic hydride compounds and the same conditions as those employed in the process of converting compound (IV) to compound (V). Thus-obtained compounds having a 17α-hydroxy-13-hydrocarbon-substituted 8,14-secogona-1,3,(10),9-tetraen-14-one nucleus (g) are substantially a racemic mixture consisting of a compound having a 17α-hydroxy-13β-hydrocarbon-substituted 8,14 - secogona - 1,3,5(10),9 - tetraen - 14-one nucleus (g–2) and a compound having a 17β-hydroxy-13α-hydrocarbon-substituted 8,14-secogona-1,3,5(10),9-tetraen-14-one nucleus (g–1). Therefore, in order to obtain an optically active product, the racemic resolution mentioned above is applicable to this mixture of compounds (g–1) and (g–2). The compound (g–1) thus separated can be converted by reaction with an oxidizing agent (e.g. chromic acid, aluminum alkoxide, dimethylsulfoxide, dicyclohexylcarbodiimide) to a compound having a 13-hydrocarbon-substituted 8,14-secogona-1,3,5-(10),9-tetraene-14,17-dione nucleus (d), which can then be reduced back to obtain the mixture of the compound (g–1) and the compound (g–2) with a metallic hydride compound as mentioned above.

The compound (III) can also be reduced to give a compound having a 13-hydrocarbon-substituted 8,14-secogona-1,3,5(10),9-tetraene-14,17-dione nucleus (d) with a selective reducing agent which is capable of reducing the double bond at the 15-position without attacking any other carbon-to-carbon or carbon-to-oxygen double bond. For the purpose it is recommended to employ so-called catalytic reduction using Raney nickel, palladium catalyst, tris(triphenylphosphine)-chlororhodium, etc, or such a reducing agent as hydrazinecarboxylic acid with hydrogen peroxide, potassium azodicarboxylate, zinc and acetic acid, and so on. Thus-obtained compound having a 13-hydrocarbon-substituted 8,14-secogona-1,3,5(10),9-tetraene-14,17-dione nucleus (d) can be converted into estradiol or 13-homologues thereof by the process disclosed in British Patent No. 1,064,011 or by the process disclosed in Chemistry and Industry, July 30, 1966, pp. 1340–1341.

It is to be understood that the following examples are solely for the purpose of illustration and are not intended to be construed as limitations of this invention, and that variations may be resorted to without departing from the spirit and scope of this invention. In the examples, "g." and "ml." are "gram" and "milliliter," respectively. Temperatures are all uncorrected, and percentages are all on the weight basis.

EXAMPLE 1

3-methoxy-8,14-secoestra-1,3,5(10),9,15-pentaene-14,17-dione 13 g. of 2-methyl-4-hydroxycylopentaene-1,3-dione is dissolved in 5 ml. of 0.12% potassium hydroxide solution in methanol. To the resultant solution is added 5 ml. of a solution of 10 g. of 6-methoxy-1-vinyl-1-tetralol in methanol and the mixture is refluxed for 3 hours. The reaction mixture is poured into water and the resultant mixture extracted with ether. The ether layer is washed with an aqueous solution of 10% potassium hydroxide and then with water and dried, followed by evaporation of the solvent to give oily residue. The oily residue is subjected to column chromatography on silica gel to obtain 3-methoxy-8,14 - secoestra - 1,3,5(10),9,15 - pentaene - 14,17 - dione as yellowish crystals melting at 89° C. Infrared absorption:

$\nu_{max}^{Nujol}$ cm.$^{-1}$: 1742, 1705 (carbonyl radical), 1610, 1575, $\nu$1500 (aromatic ring)

Nuclear magnetic resonance spectrum:
(δ,CDCl$_3$)
1.2—(3H, singlet, 18—CH$_3$)
1.78—(2H, quartet, J=6 cps. 6—CH$_2$)
2.5–2.82—(6H, 7, 8, 12—CH$_2$)
3.76—(3H, singlet, —OCH$_3$)
2.52—(1H, triplet, J=9 cps., 11—CH)
6.56–7.4—(3H, aromatic ring)
7.2—(2H, singlet, 15,16—C—H)

EXAMPLE 2

3-methoxy-8,14-secoestra-1,3,5(10),9,15-pentaene-14-17-dione

To a solution of 10 g. of S-2-(6'methoxy-1-tetraliden)-ethylthiuronium acetate dissolved in 240 ml. of methanol is added 5 g. of 4-hydroxy-2-methylcyclopentane-1,3-dione and the mixture is refluxed for one hour. The reaction mixture is extracted with ether, and the ether layer is washed with 5% aqueous solution of sodium hydroxide and with water and is dried, followed by evaporation of the solvent to give 7 g. of 3-methoxy-8,14-secoestra-1,3,5-(10),9,15-pentaene-14-17-dione as yellowish crystals melting at 89° C.

Elementary analysis.—Calculated for $C_{19}H_{20}O_3$; C, 77.03; H, 6.75. Found: C, 76.66; H, 6.88.

EXAMPLE 3

3-methoxy-13-ethyl-8,14-secogona-1,3,5(10),9,15-pentaene-14,17-dione

A solution of 10 g. of S-2-(6'-methoxy-1'-tetraliden)-ethylthiuronium acetate and 5.3 g. of 2-ethyl-4-hydroxycyclopentane-1,3-dione dissolved in 150 ml. of methanol is refluxed for one hour and to the reaction solution is added about 500 ml. of water, followed by extraction with ether. After being washed with a 5% aqueous solution of sodium hydroxide and then with water, the ether layer is dried, followed by evaporation of the solvent to give 6.8 g. of yellowish crystals, which are recrystallized from methanol to give 7.2 g. of 3-methoxy-13-ethyl-8,14-secogona-1,3,5(10),9,15-pentaene - 14,17 - dione as crystals melting at 101° C.

Elementary analysis.—Calculated for $C_{20}H_{22}O_3$; C, 77.39; H, 7.14. Found: C, 77.29; H, 6.98.
Infrared absorption:

$\nu_{max}^{Nujol}$ cm.$^{-1}$: 1742, 1705 (carbonyl radical), 1610, 1575, 1500 (aromatic ring)

EXAMPLE 4

3-methoxy-13-isopropyl-8,14-secogona-1,3,5(10), 9,15-pentaene-14,17-dione

A solution of 10 g. of S-2-(6'-methoxy-1'-tetraliden) ethylthiuronium acetate and 5.8 g. of 2-isopropyl-4-hydroxycyclopentane-1,3-dione dissolved in 150 ml. of methanol is refluxed for one hour and to the reaction solution is added about 500 ml. of water, followed by extraction with ether. The ether layer is shaken with a 5% aqueous solution of sodium hydroxide and the mixture is left standing for one hour. After being washed with water and dried, the ether layer is subjected to evaporation of the solvent to give 6.9 g. of yellowish crystals, which are recrystallized from methanol to give 5 g. of 3-methoxy - 13 - isopropyl - 8,14 - secogona - 1,3,5(10),9,15-pentaene-14,17-dione as crystals melting at 110° C.

Elementary analysis.—Calculated for $C_{21}H_{24}O_3$: C, 77.75; H, 7.46. Found: C, 77.60; H, 7.52.

EXAMPLE 5

3-methoxy-13-benzyl-8,14-secogona-1,3,5(10),9,15-pentaene-14,17-dione

This compound is prepared from 10 g. of S-2-(6'-methoxy-1'-tetraliden)ethylthiuronium acetate and 7.6 g. of 2-benzyl-4-hydroxycyclopentane-1,3-dione as yellowish crystals melting at 126° C. in the same manner as in Example 2. Yield: 5 g.

Elementary analysis.—Calculated for $C_{25}H_{24}O_3$: C, 80.62; H, 6.50. Found: C, 80.30; H, 6.47.

EXAMPLE 6

3-methoxy-13-ethyl-8,14-secogona-1,3,5(10)9,15-pentaene-14,17-dione

To a solution of 5 g. of 2-ethyl-4-hydroxy-cyclopentane-1,3-dione in 30 ml. of pyridine is added 4 g. of ethyl chlorocarbonate and the mixture is left standing for 24 hours, followed by evaporation of the pyridine, under reduced pressure. The residue is extracted with ether and the ether layer is subjected to evaporation of the solvent to give 3.5 g. of 2-ethyl-4-ethoxycarbonyloxy-cyclopentane-1,3-dione as crystals, which are recrystallized from a mixture of ether and hexane to melt at 96° C.

Elementary analysis.—Calculated for $C_{10}H_{14}O_5$: C, 56.07; H, 6.59. Found: C, 56.30; H, 6.42.

Thus-obtained 2 - ethyl-4-ethoxycarbonyloxy-cyclopentane-1,3-dione (1.1 g.) is added to a solution of 1.5 g. of S-2-(6'-methoxy-1'-tetraliden)ethylthiuronium acetate in 30 ml. of methanol, and the mixture is refluxed for 30 minutes. To the reaction mixture is added water and the whole mixture is extracted with ether. After the ether extract is washed with an aqueous solution of sodium hydrogen carbonate and with water and then dried, it is subjected to evaporation of the ether to give residue from which is obtained 1.2 g. of crystals of 3-methoxy-13-ethyl-8,14-secogona - 1,3,5(10),9,15 - pentaene-14,17-dione.

EXAMPLE 7

3-methoxy-8,14-secoestra-1,3,5(10),9-tetraene-14,17-dione

To a solution of 0.5 g. of 3-methoxy-8,14-secoestra-1,3,5(10),9,15-pentaene-14,17-dione in 25 ml. of dioxane is added 0.1 g. of Raney-nickel, and the mixture is shaken in hydrogen-gas stream at room temperature and at atmospheric pressure until 38 ml. of hydrogen-gas is adsorbed. The catalyst is filtered off, and the filtrate is concentrated to dryness to give 0.44 g. of crude crystals of 3-methoxy-8,14-secoestra - 1,3,5(10),9 - tetraene-14,17-dione, which is recrystallized from ethanol to obtain colorless prisms melting at 79° C.

EXAMPLE 8

3-methoxy-8,14-secoestra-1,3,5(10),9-tetraene-14,17-dione

To a suspension of 5 g. of 3-methoxyestra-1,3,5(10),9,15-pentane-14,17-dione, 20 g. of potassium azodicarboxylate and 300 ml. of dioxane is gradually added 30 ml. of acetic acid and 200 ml. of dioxane. The mixture is left standing overnight and then poured into water, followed by extraction with ether. The ether layer is washed with water and dried, and is subjected to evaporation of the ether to give an oil, which is subjected to chromatography on silica-gel to give 4 g. of crude crystals of 3-methoxy-8,14-secoestra-1,3,5(10),9 - tetraene-14,17-dione. The crude crystals are recrystallized from ethanol to give colorless prisms melting at 79° C.

EXAMPLE 9

3-methoxy-8,14-secoestra-1,3,5(10),9-tetraene-14,17-dione

To a suspension of 3 g. of zinc powder in 100 ml. of acetic acid is added a solution of 1 g. of 3-methoxy-8,14-secoestra-1,3,5(10),9,15-pentaene-14,17-dione in 100 ml. of acetic acid, followed by stirring for one hour at room temperature. The reaction mixture is filtered to remove the zinc-powder and the filtrate is poured into water, followed by extraction with ether. The ether layer is washed with 5% aqueous solution of sodium hydrogen carbonate and with water, dried over sodium sulfate, and is subjected to evaporation of the ether to give 1 g. of the crystals which are recrystallized from ethanol to give 7 g. of 3-methoxy-8,14-secoestra-1,3,5(10),9-tetraene-14,17-dione melting at 79° to 80° C.

EXAMPLE 10

3-methoxy-13-ethyl-8,14-secogona-1,3,5(10),9-tetraene-14,17-dione

This compound is prepared from 3 g. of 3-methoxy-13-ethyl-8,14-secogona-1,3,5(10),9,15 - pentaene-14,17-dione as needles melting at 58° to 60° C., in the same manner as in Example 7. Yield: 2.5 g.

EXAMPLE 11

3-methoxy-13-isopropyl-8,14-secogona-1,3,5(10),9-tetraene-14,17-dione

This compound is prepared from 2 g. of 3-methoxy-13-isopropyl - 8,14 - secogona-1,3,5(10),9,15-pentaene-14,17-dione as colorless prisms melting at 70° to 71° C., in the same manner as in Example 7. Yield: 1.5 g.

EXAMPLE 12

($\pm$) 3-methoxy-17$\alpha$-hydroxy-8,14-secoestra-1,3,5(10),9-tetraen-14-one

To a solution of 0.2 g. of 3-methoxy-8,14-secoestra-1,3,5(10),9,15-pentaene-14,17-dione in 10 ml. of ether is added 0.05 g. of lithium aluminum hydride, followed by stirring at room temperature for 4 hours. After the addition of 10 ml. of ethyl acetate, water is added to the reaction solution to decompose excess lithium aluminum hydride, followed by extracting with ether. The ether layer is washed with water and dried and then subjected to evaporation to give a residue, which is recrystallized from ethanol to give 0.15 g. of ($\pm$) 3-methoxy-17$\alpha$-hydroxy-8,14-secoestra-1,3,5(10),9-tetraen-14-one.

EXAMPLE 13

($\pm$) 3-methoxy-17$\alpha$-hydroxy-8,14-secoestra-1,3,5(10),9-tetraen-14-one

To a solution of 2 g. of 3-methoxy-8,14-secoestra-1,3,5(10),9,15-pentaene-14,17-dione in 100 ml. of methanol is added 0.08 g. of sodium borohydride under ice-cooling. After 2 hours, the reaction solution is shaken with a mixture of water and ether, followed by separation of the ether layer. The ether layer is washed with water and dried, and is concentrated to dryness to give 1.8 g. of ($\pm$) 3-methoxy-17$\alpha$-hydroxy-8,14-secoestra-1,3,5(10),9-tetraen-14-one, which is recrystallized from a mixture of ether and hexane to obtain 1.6 g. of crystals melting at 74° C.

*Elementary analysis.*—Calculated for $C_{19}H_{24}O_3$: C, 76.00; H, 8.00. Found: C, 76.27; H, 7.92.

Ultraviolet absorption:

$$\lambda_{max.}^{ethanol}: 266\ m\mu\ (\epsilon=193000)$$

EXAMPLE 14

($\pm$) 3-methoxy-13$\beta$-ethyl-17$\alpha$-hydroxy-8,14-secogona-1,3,5(10),9-tetraen-14-one This compound is prepared in the same manner as in Example 13 from 13 g. of 3-methoxy-13-ethyl-8,14-secogona-1,3,5(10),9,15-pentaene-14,17-dione as yellowish oil.

Infrared absorption:

$$\nu_{max.}^{Nujol}\ cm.^{-1}: 3400,\ 1725$$

EXAMPLE 15

3-methoxyestra-1,3,5(10),8(14),9,15-hexaen-17-one

To a solution of 2 g. of 3-methoxy-8,14-secoestra-1,3,5(10),9,15-pentaene-14,17-dione dissolved in 80 ml. of methanol is added 1.5 ml. of concentrated hydrochloric acid and the mixture is refluxed for 5 minutes. The reaction solution is poured into water and the mixture is extracted with ether. After being washed with an aqueous solution of sodium hydrogen carbonate and then with ether, the extract is dried with sodium sulfate, followed by being subjected to evaporation to remove ether to give 1.6 g. of ($\pm$) 3-methoxyestra-1,3,5(10),8(14),9,15-hexaen-17-one, which is recrystallized from methanol to give 1.4 g. of dark-green crystals melting at 108–110° C.

*Elementary analysis.*—Calculated for $C_{19}H_{18}O_2$: C, 82.01; H, 6.47. Found: C, 82.09; H, 6.32.

Ultraviolet absorption:

$$\lambda_{max.}^{ethanol}\ m\mu\ (\epsilon): 1690\ (c.=0)$$

EXAMPLE 16

3-methoxy-13-ethylgona-1,3,5(10),8(14),9,15 hexaen-17-one

In a mixture of 80 ml. of methanol and 10 ml. of 2-normal hydrochloric acid is suspended 1.3 g. of 3-methoxy-13-ethyl - 8,14 - secogona-1,3,5(10),9,15-pentaene-14,17-dione, followed by stirring for one hour at 60° C. Then the suspension is shaken with a mixture of ether and water and the resulting ether layer is separated. The ether layer is subjected to evaporation to remove ether to give 1.0 g. of 3-methoxy-13-ethylgona-1,3,5(10),8(14),9,15-hexaen-17-one.

EXAMPLE 17

3-methoxy-13-ethylgona-1,3,5(10),8(14),9,15-hexaen-17-one

To a solution of 1.2 g. of 3-methoxy-13-ethyl-8,14-secogona-1,3,5(10),9,15-pentaene-14,17-dione dissolved in 50 ml. of methanol is added 2 ml. of concentrated hydrochloric acid and the mixture is refluxed for 5 minutes. The reaction solution is poured into water and the resultant mixture is extracted with ether. After being washed with an aqueous solution of sodium hydrogen carbonate and then with water, the ether layer is dried and subjected to evaporation to remove ether to give 0.95 g. of (±) 3-methoxy - 13β - ethylgona-1,3,5(10),8(14),9,15-hexaen-17-one as dark red oil.

Ultraviolet absorption:

$\lambda_{max.}^{ethanol}$ m$\mu$ ($\epsilon$): 254 (15500), 287 (12800) 310 (16500), 378 (48100)

Infrared absorption:

$\nu_{max.}^{film}$ cm.$^{-1}$: 1698 (c.=0)

EXAMPLE 18

3-methoxy-13-isopropylgona-1,3,5(10),8(14),9,15-hexaen-17-one

To a solution of 1.6 g. of 3-methoxy-13-isopropyl-8,14-secogona-1,3,5(10),9,15-pentaene-14,17-dione dissolved in 70 ml. of methanol is added 3 ml. of concentrated hydrochloric acid and the mixture is refluxed for 10 minutes. The reaction mixture is poured into water and the resultant mixture is extracted with ether. After being washed with an aqueous solution of sodium hydrogen carbonate and then with water, the ether layer is dried, and subjected to evaporation to remove ether, whereby 1.4 g. of (±) 3-methoxy-13-isopropylgona-1,3,5(10),8(14), 9,15-hexaen-17-one is obtained as dark red oil.

Ultraviolet absorption:

$\lambda_{max.}^{ethanol}$ m$\mu$ ($\epsilon$): 256 (11660), 285 (12350), 310 (9070), 378 (45000)

Infrared absorption:

$\nu_{max.}^{film}$ cm.$^{-1}$: 1697 (c.=0)

EXAMPLE 19

3-methoxy-13-benzylgona-1,3,5(10),8(14),9,15-hexaen-17-one

To a solution of 2 g. of 3-methoxy-13-benzyl-8,14-secogona-1,3,5(10),9,15-pentaene-14,17-dione dissolved in 120 ml. of methanol is added 5 ml. of concentrated hydrochloric acid and the mixture is refluxed for 20 minutes. The reaction solution is poured into water and the resultant mixture is extracted with ether. After being washed with an aqueous solution of sodium hydrogen carbonate and then with water, the ether layer is dried with sodium sulfate and subjected to evaporation to remove ether to give 1.2 g. of (±)3-methoxy-13β-benzylgona-1,3,5(10),8(14),9,15-hexaen-17-one, which is crystallized from methanol to obtain dark green crystals melting at 149–150° C.

*Elementary analysis.*—Calculated for $C_{25}H_{22}O_2$: C, 84.71; H, 6.26. Found: C, 84.32; H, 6.26.

Ultraviolet absorption:

$\lambda_{max.}^{ethanol}$ m$\mu$ ($\epsilon$):255 (18400), 292 (12400), 317 (14700), 389 (1520)

Infrared absorption:

$\nu_{max.}^{Nujol}$ cm.$^{-1}$:1700 (c.=0)

EXAMPLE 20

3-methoxyestra-1,3,5(10),8(14),9,15-hexaen-17β-ol

A solution of 1.1 g. of (±)3-methoxyestra-1,3,5(10), 8(14),9,15-hexaen-17-one dissolved in a mixture of 90 ml. of methanol and 10 ml. of tetrahydrofuran is cooled at a temperature lower than −20° C. and to this solution is added 0.5 g. of sodium borohydride, followed by stirring for one hour. The reaction soution is poured into water and the mixture is extracted with ether. The ether layer, after being washed with water and dried, is concentrated to obtain 0.8 g. of (±)3-methoxyestra-1,3,5(10), 8,(14),9,15-hexaen-17β-ol, which is recrystallized from metanol to give crystals melting at 125–135° C.

Ultraviolet absorption:

$\lambda_{max.}^{ethanol}$:273 m$\mu$ ($\epsilon$=33000)

Infrared absorption:

$\nu_{max.}^{Nujol}$ cm.$^{-1}$:3350 (OH)

EXAMPLE 21

3-methoxy-13-ethylgona-1,3,5(10),8(14),9,15-hexaen-17β-ol

A solution of 0.9 g. of (±)3-methoxy-13-ethylgona-1, 3,5(10),8(14),9,15-hexaen-17-one dissolved in a mixture of 50 ml. of methanol and 1 ml. of tetrahydrofuran is cooled at a temperature lower than −10° C. and to this solution is added 1.1 g. of sodium borohydride, followed by stirring for 10 minutes. The reaction solution is extracted with ether, and the ether layer, after being washed with water and dried, is concentrated to obtain 0.9 g. of (±)3 - methoxy - 13 - ethylgona-1,3,5(10),8(14),9,15-hexaen-17β-ol as red oil.

Ultraviolet absorption:

$\lambda_{max.}^{ether}$ m$\mu$ ($\epsilon$):275 (15800)

Infrared absorption:

$\nu_{max.}^{CCl_4}$ cm.$^{-1}$:3500 (OH)

EXAMPLE 22

3-methoxy-13-isopropylgona-1,3,5(10),8(14),9,15-hexaen-17β-ol

A solution of 1.4 g. of (±)3-methoxy-13β-isopropyl-gona-1,3,5(10),8(14),9,15-hexaen-17-one dissolved in a mixture of 50 ml. of methanol and 5 ml. of tetrahydrofuran is cooled at a temperature lower than −10° C. and to this solution is added 1.5 g. of sodium borohydride, followed by stirring for 1.5 hours. The reaction solution is poured into water and the resultant mixture is extracted with ether. The ether layer, after being washed with water and dried, is concentrated to give 1.3 g. of (±)3-methoxy - 13β - isopropylgona-1,3,5(10),8(14),9,15-hexaen-17β-ol is red oil.

Ultraviolet absorption:

$\lambda_{max.}^{ethanol}$ m$\mu$ ($\epsilon$):276 (11700)

Infrared absorption:

$\nu_{max.}^{CCl_4}$ cm.$^{-1}$:3500 (OH)

EXAMPLE 23

3-methoxy-13-benzylgona-1,3,5(10),8(14),9,15-hexaen-17β-ol

A solution of 0.8 g. of (±)3-methoxy-13β-benzylgona-1,3,5(10),8(14),9,15-hexaen-17-one dissolved in a mixture of 150 ml. of methanol and 20 ml. of tetrahydrofuran is cooled at a temperature lower than −10° C. and to this solution is added 0.5 g. of sodium borohydride, followed by stirring for one hour. The reaction solution is poured into water and the resultant mixture is extracted with ether. The ether layer, after being washed with water and dried, is concentrated to give 0.7 g. of (±)3-methoxy - 13β - benzylgona-1,3,5(10),8(14),9,15-hexaen-17β-ol as red oil.

Ultraviolet absorption:

$\lambda_{max.}^{ethanol}$ m$\mu$ ($\epsilon$): 278(10900)

Infrared absorption:

$\nu_{max.}^{CCl_4}$ cm.$^{-1}$:3650 (OH)

EXAMPLE 24

3-methoxyestra-1,3,5(10),8-tetraen-17β-ol

To a solution of 0.8 g. of (±)3-methoxyestra-1,3,5(10),8(14),9,15-hexaene-17β-ol dissolved in 100 ml. of dioxane is added 2 g. of Raney-nickel and the mixture is shaken in hydrogen-gas stream at room temperature and atmospheric pressure. After 100 ml. of hydrogen-gas is absorbed, the reaction mixture is subjected to filtration to remove the catalyst. The filtrate is concentrated under reduced pressure to give 0.6 g. of ±3-methoxyestra-1,3,5(10),8-tetraen-17β-ol as crystals melting at 126° C.

EXAMPE 25

3-methoxyestra-1,3,5(10),8-tetraen-17β-ol

To a solution of 0.5 g. of (±)3-methoxyestra-1,3,5(10),8,(14),9,15-hexaen-17β-ol dissolved in 50 ml. of ethanol is added a mixture of 30 ml. of 8% hydrazine hydrate and 3 mg. of cupric sulfate. To the resultant mixture is added dropwise 80 ml. of a 15% aqueous solution of hydrogen peroxide during 3 hours at 5 to 10° C. under vigorous stirring. The reaction solution is concentrated under reduced pressure, and the residue is shaken with a mixture of water and ethyl acetate, followed by separation of the ethyl acetate layer. After being washed with water, with dilute sulfuric acid and then with an aqueous solution of sodium hydrogen carbonate the ether layer is dried, and subjected to evaporation to remove the solvent to give crystals of (±)3-methoxy-estra-1,3,5(10),8-tetraen-17β-ol, which are recrystallized to give colorless crystals melting at 126° C.

EXAMPLE 26

3-methoxy-13β-ethylgona-1,3,5(10),8-tetraen-17β-ol

To a solution of 1.3 g. of (±)3-methoxy-13β-ethyl-gona-1,3,5(10),8(14),9,15-hexaen-17β-ol dissolved in 150 ml. of dioxane is added 2 g. of Raney-nickel, and the mixture is shaken in hydrogen-gas stream. After 150 ml. of hydrogen-gas is absorbed, the reaction solution is subjected to filtration to remove the catalyst, and the filtrate is concentrated under reduced pressure. The residue is subjected to column-chromatography using 40 g. of silica-gel, whereupon 1 g. of (±)3-methoxy-13β-ethylgona-1,3,5(10),8 - tetraen - 17β - ol is obtained from an eluate with a mixture of benzene-ether (10:1).

EXAMPLE 27

3-methoxy-13β-ethylgona-1,3,5(10),8-tetraen-17β-ol

To a solution of 0.1 g. of (±)3-methoxy-13-ethylgona-1,3,5(10),8(14),9,15-hexaen-17β-ol dissolved in 10 ml. of ethanol is added an aqueous solution of 0.3 g. of sodium hydroxide in 3 ml. of water. To the resultant solution is added little by little 4 g. of an alloy of nickel and aluminum (4:1 by weight) for one hour under stirring at room temperature. Then the reaction solution is subjected to filtration and to the filtrate is added a large volume of water to precipitate crystals of (±)3-methoxy-13β-ethylgona-1,3,5(10),8-tetraen-17β-ol, which are recrystallized from ethanol to give colorless needles melting at 108° C. Yield: 0.08 g.

EXAMPLE 28

3-methoxy-13β-isopropylgona-1,3,5(10),8-tetraen-17β-ol

To a solution of 1.4 g. of (±)3-methoxy-13β-isopropylgona-1,3,5(10),8(14),9,15-hexaen-17β-ol dissolved in 150 ml. of dioxane is added 2.5 g. of Raney-nickel and the mixture is shaken in hydrogen-gas stream. After about 130 ml. of hydrogen-gas is absorbed, the reaction solution is subjected to filtration and the filtrate is concentrated under reduced pressure. The residue is subjected to column-chromatography using 50 g. of silica-gel, whereupon 1 g. of (±)3-methoxy-13β-isopropylgona-1,3,5(10),8-tetraen-17β-ol is obtained from an eluate with a mixture of benzene and ether (10:1).

EXAMPLE 29

3-methoxy-13β-benzylgona-1,3,5(10),8-tetraen-17β-ol

To a solution of 0.8 g. of (±)3-methoxy-13β-benzyl-gona - 1,3,5,(10),8(14),15-hexaen-17β-ol dissolved in 80 ml. of dioxane is added 1 g. of Raney-nickel, and the mixture is shaken in hydrogen-gas stream. After about 115 ml. of hydrogen-gas is absorbed, the reaction solution is subjected to filtration and the filtrate is concentrated under reduced pressure. The residue is subjected to column-chromatography using 30 g. of silica-gel, whereupon from an eluate of benzene and ether (10:1) there is obtained 0.4 g. of (±)3 - methoxy-13β-benzylgona-1,3,5(10),8-tetraen-17β-ol.

Having thus disclosed the invention, what is claimed is:

1. A process for preparing a compound having a 13-hydrocarbon-substituted 8,14 - secogona-1,3,5(10),9,15-pentaene-14,17-dione nucleus which comprises allowing a compound having a 2-(1′-hydroxy-1′-tetralino)ethylene or S-2-(1′-tetraliden)ethylthiuronium nucleus to react with a compound having a 4-hydroxy-2-hydrocarbon-substituted cyclopentane-1,3-dione nucleus.

2. A process for preparing a compound having a 13-hydrocarbon-substituted gona - 1,3,5(10),8-tetraen-17β-ol nucleus which comprises subjecting a compound having a 13-hydrocarbon-substituted gona-1,3,5(10),8(14),9,15-hexaen-17β-ol nucleus to catalytic reduction.

3. A process for preparing a compound having a 13-hydrocarbon-substituted gona - 1,3,5(10),8-tetraen-17β-ol nucleus which comprises (1) the step of allowing a compound having a 2-(1′-hydroxy-1′-tetralino)ethylene nucleus or an S-2-(1′-tetraliden)ethylthiuronium nucleus to react with a compound having a 4-hydroxy-2-hydrocarbon substituted cyclopentane-1,3-dione nucleus to produce a compound having a 13-hydrocarbon-substituted 8,14-secogona-1,3,5(10),9-15-pentaene - 14,17 - dione nucleus, (2) the step of subjecting the so-obtained compound having a 13-hydrocarbon-substituted 8,14-secogona-1,3,5(10),9,15-pentaene-14,17-dione nucleus to dehydration in the presence of acid catalyst to produce a compound having a 13-hydrocarbon-substituted gona-1,3,5-(10),8(14),9,15-hexaen-17-one nucleus, (3) the step of allowing a metallic hydride compound to act upon the so-obtained compound having a 13-hydrocarbon-substituted gona-1,3,5(10),8(14),9-15-hexaen-17-one nucleus to produce a compound having a 13-hydrocarbon-substituted gona-1,3,5(10),8(14),9,15-hexaen-17β-ol nucleus, and (4) the step of subjecting so-obtained compound having a 13-hydrocarbon-substituted gona-1,3,5(10),8-(14),9,15-hexaen-17β-ol nucleus to catalytic reduction.

4. A process for preparing a compound having a 17α-hydroxy-13-hydrocarbon-substituted 8,14-secogona-1,3,5-(10),9-tetraen-14-one nucleus which comprises allowing a metallic hydride compound to act upon a compound having a 13-hydrocarbon-substituted 8,14-secogona-1,3,5-(10),9,15-pentaene-14,17-dione nucleus to reduce the double bond at the 15-position and the oxo group at the 17-position of the said compound.

References Cited

UNITED STATES PATENTS

| | | | |
|---|---|---|---|
| 3,383,384 | 5/1968 | Pappo et al. | 260—239.5 |
| 3,391,165 | 7/1968 | Hughes et al. | 260—97.3 |
| 3,394,151 | 7/1968 | Hoffsommer et al. | 260—397.4 |

HENRY A. FRENCH, Primary Examiner

U.S. Cl. X.R.

260—397.45, 586, 590, 999

PO-1050
(5/69)

UNITED STATES PATENT OFFICE
CERTIFICATE OF CORRECTION

Patent No. 3,494,942                    Dated   April 17, 1970

Inventor(s)   Takuichi Miki, Kentaro Hirage and Tsunehiko Asako

It is certified that error appears in the above-identified patent and that said Letters Patent are hereby corrected as shown below:

The subject matter below has been omitted after line 56 of column 2 of the patent.

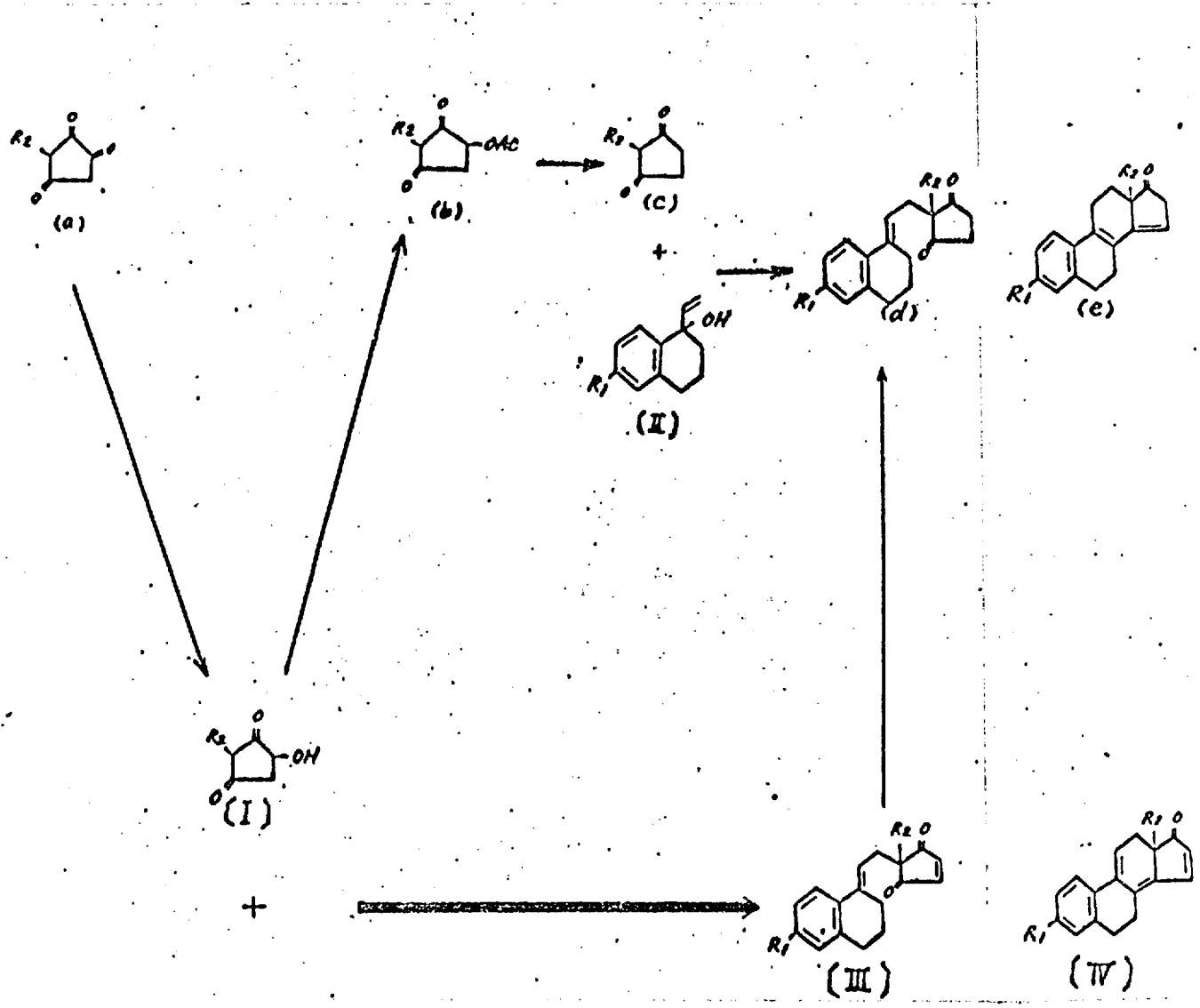

- 1 -

UNITED STATES PATENT OFFICE
CERTIFICATE OF CORRECTION

Patent No. 3,494,942         Dated April 17, 1970

Inventor(s) Takuichi Miki, Kentaro Hiraga and Tsunehiko Asako

It is certified that error appears in the above-identified patent and that said Letters Patent are hereby corrected as shown below:

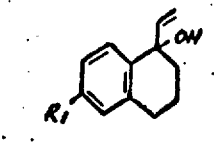

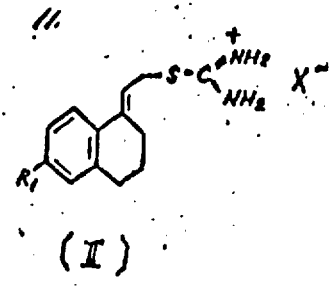

(I)

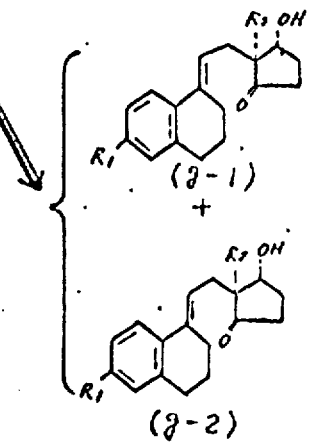

- 2 -

UNITED STATES PATENT OFFICE
CERTIFICATE OF CORRECTION

Patent No. 3,494,942    Dated April 17, 1970

Inventor(s) Takuichi Miki, Kentaro Hiraga and Tsunehiko Asako

It is certified that error appears in the above-identified patent and that said Letters Patent are hereby corrected as shown below:

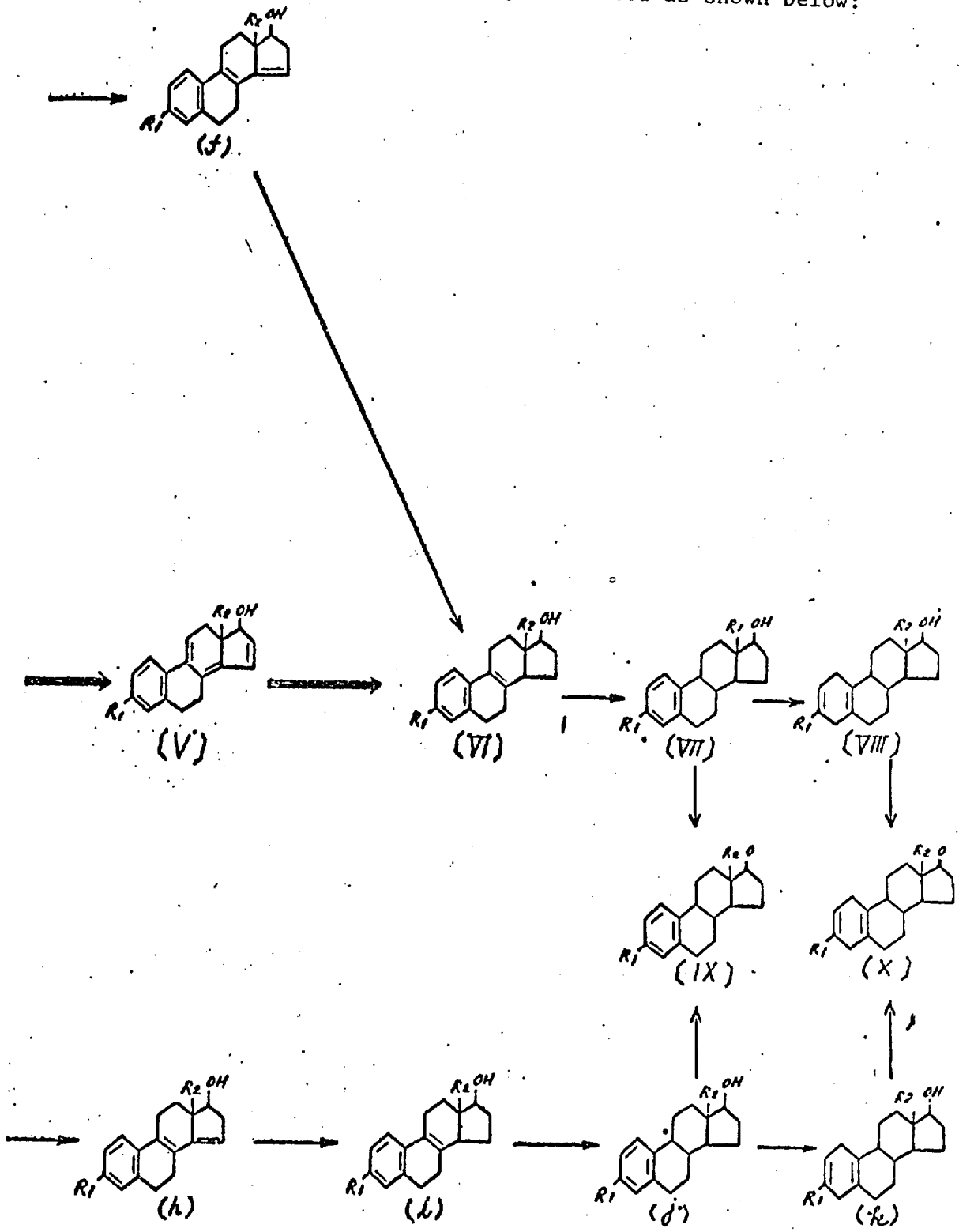

- 3 -

3,494,942

(4)

Signed and sealed this 18th day of August 1970.

(SEAL)
Attest:

EDWARD M. FLETCHER, JR.
Attesting Officer

WILLIAM E. SCHUYLER, JR.
Commissioner of Patents